(12) United States Patent
Plude

(10) Patent No.: US 11,454,048 B2
(45) Date of Patent: Sep. 27, 2022

(54) SHAPE MEMORY ALLOY LOCKING APPARATUSES

(71) Applicant: The Boeing Company, Chicago, IL (US)

(72) Inventor: Leo Walter Plude, Seattle, WA (US)

(73) Assignee: The Boeing Company, Chicago, IL (US)

( * ) Notice: Subject to any disclaimer, the term of this patent is extended or adjusted under 35 U.S.C. 154(b) by 989 days.

(21) Appl. No.: 16/183,395

(22) Filed: Nov. 7, 2018

(65) Prior Publication Data

US 2020/0141156 A1 May 7, 2020

(51) Int. Cl.
*E05B 47/00* (2006.01)
*B64C 1/14* (2006.01)

(52) U.S. Cl.
CPC ........ *E05B 47/0009* (2013.01); *B64C 1/1407* (2013.01); *E05Y 2900/502* (2013.01)

(58) Field of Classification Search
CPC .......................... E05B 47/0009; E05B 47/0011
See application file for complete search history.

(56) References Cited

U.S. PATENT DOCUMENTS

| | | | |
|---|---|---|---|
| 1,701,491 A | 2/1929 | Casey | |
| 4,915,326 A | 4/1990 | Plude | |
| 5,984,234 A | 11/1999 | Brouwer et al. | |
| 6,951,320 B2 | 10/2005 | Buchs et al. | |
| 7,137,595 B2 | 11/2006 | Barba | |
| 7,303,167 B2 | 12/2007 | Barba | |
| 7,340,883 B2 | 3/2008 | Wood et al. | |
| 7,364,211 B2 | 4/2008 | Niskanen et al. | |
| 7,644,575 B2 | 1/2010 | Wood et al. | |
| 7,744,038 B2 * | 6/2010 | Sankrithi | B64C 23/076 244/199.4 |
| 7,878,459 B2 | 2/2011 | Mabe et al. | |
| 8,118,264 B2 | 2/2012 | Mabe et al. | |
| 8,186,143 B2 | 5/2012 | Wood et al. | |
| 8,397,485 B2 | 3/2013 | Wood et al. | |
| 8,584,987 B2 | 11/2013 | Madsen et al. | |
| 2003/0177974 A1 * | 9/2003 | Dominique | E05B 85/107 70/264 |
| 2004/0035687 A1 * | 2/2004 | von Behrens | E05B 47/0009 200/48 R |

(Continued)

*Primary Examiner* — Kristina R Fulton
*Assistant Examiner* — Steven A Tullia
(74) *Attorney, Agent, or Firm* — McDonnell Boehnen Hulbert & Berghoff LLP

(57) ABSTRACT

In an example, method for locking/unlocking a structure is described. The method includes attaching a first end of a pawl to a support assembly, wherein the pawl comprises a shape memory alloy (SMA) element configured to transition between a first configuration and a second configuration, and wherein the pawl is attached to the support assembly such that a second end of the pawl is movable between a locked position that prevents a rotatable shaft from rotating and an unlocked position that allows the rotatable shaft to rotate, activating the SMA element, thereby causing the SMA element to take on the first configuration and move the second end of the pawl to the locked position, and deactivating the SMA element, thereby causing the SMA element to take on the second configuration and move the second end of the pawl from the locked position to the unlocked position.

20 Claims, 7 Drawing Sheets

(56) References Cited

U.S. PATENT DOCUMENTS

| | | | |
|---|---|---|---|
| 2005/0146147 A1* | 7/2005 | Niskanen | E05B 81/00 |
| | | | 292/336.3 |
| 2007/0215445 A1* | 9/2007 | Alacqua | E05B 47/0009 |
| | | | 200/17 R |
| 2009/0230700 A1* | 9/2009 | Arabia | E05B 77/06 |
| | | | 70/93 |
| 2009/0250952 A1* | 10/2009 | Niskanen | E05B 47/0009 |
| | | | 292/341.15 |
| 2010/0097223 A1* | 4/2010 | Kruest | E05B 47/0009 |
| | | | 340/572.1 |
| 2012/0126551 A1* | 5/2012 | Alexander | E05B 47/0009 |
| | | | 340/572.1 |
| 2014/0210219 A1* | 7/2014 | Pipp | E05B 85/107 |
| | | | 70/264 |

\* cited by examiner

SHAPE MEMORY ALLOY LOCKING APPARATUSES

FIELD

The present disclosure relates generally to locking and unlocking structures, and more particularly, to locking and unlocking structures using a shape memory alloy (SMA).

BACKGROUND

Locking apparatuses can be employed in various environments to allow structures (e.g., doors, cabinets, stowbins, windows) to be locked and unlocked. For example, an aircraft may include a locking actuator for preventing an undesired opening of an aircraft door and for unlocking the aircraft door during an emergency scenario or when power has otherwise been removed from the locking actuator.

These and other existing locking apparatuses often include a complex arrangement of components such as solenoids, electric motors, bearings, springs, weights, and screw gears. However, existing locking apparatuses can be complex and often contain more components than desired, which can increase the time spent designing and installing such apparatuses. For example, existing locking actuators for aircraft doors typically include redundant components required to return the doors to an unlocked state after power is removed from the locking actuators. The complexity of existing locking apparatuses can also increase the cost and time spent manufacturing and installing such locking apparatuses.

What is needed is a less complex locking apparatus that can reliably lock and unlock structures when desired.

SUMMARY

In an example, a method for locking and unlocking a structure is described. The method comprises attaching a first end of a pawl to a support assembly, where the pawl comprises a shape memory alloy (SMA) element configured to transition between a first configuration and a second configuration, and where the pawl is attached to the support assembly such that a second end of the pawl is movable between a locked position that prevents a rotatable shaft from rotating via engagement of the second end of the pawl with a lug of the rotatable shaft and an unlocked position that allows the rotatable shaft to rotate via disengagement of the second end of the pawl from the lug, activating the SMA element, thereby causing the SMA element to take on the first configuration and move the second end of the pawl to the locked position, and deactivating the SMA element, thereby causing the SMA element to take on the second configuration and move the second end of the pawl from the locked position to the unlocked position.

In another example, a locking apparatus is described. The locking apparatus comprises a support assembly, a rotatable shaft comprising a lug, and a pawl. The pawl comprises a SMA element configured to transition between a first configuration and a second configuration, where a first end of the pawl is attached to the support assembly such that a second end of the pawl is movable between a locked position that prevents the rotatable shaft from rotating via engagement of the second end of the pawl with a lug of the rotatable shaft and an unlocked position that allows the rotatable shaft to rotate via disengagement of the second end of the pawl from the lug. When the SMA element is activated, the SMA element takes on the first configuration and moves the second end of the pawl to the locked position, and when the SMA element is deactivated, the SMA element takes on the second configuration and moves the second end of the pawl from the locked position to the unlocked position.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
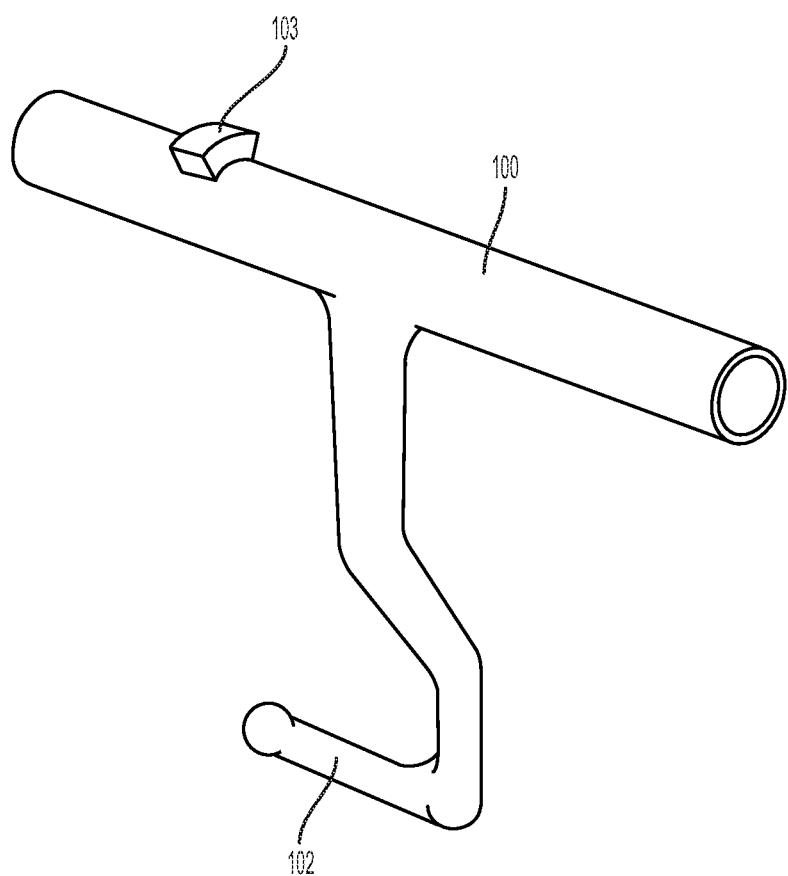
FIG. 1 is a perspective view of a rotatable shaft and a handle, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the terms "substantially," "about," and "proximate" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise specifically noted, elements depicted in the drawings are not necessarily drawn to scale.

Within examples, methods and systems for locking and unlocking structures are described. The term "structure," used in this context, refers to a physical structure that functions as a means of entry into an area and/or exit from the area. For example, such a structure can be a door, a stowbin, a window, or a cabinet, among other possibilities.

The methods and systems described herein implement shape memory alloy (SMA) elements in locking apparatuses. An SMA element is a combination of metals (e.g., Nickel Titanium, also known as "Nitinol"), or a combination of one or more metals and another element (e.g., Carbon), that has thermal and mechanical properties and can be manufactured to a variety of shapes and sizes. These properties enable the SMA element to be thermally controlled to transition between different configurations. For example, an SMA element can take on a first configuration (e.g., a first shape) when activated (e.g., heated) and can take on a second configuration (e.g., a second shape) when deactivated (e.g., removing heat from the SMA element). The rate at which an SMA element transitions between configurations can depend upon the amount and rate of thermal energy applied to the SMA element.

Some existing locking apparatuses implement SMA elements. However, such locking apparatuses still include, and often require, an undesirable number of springs, bearings, solenoids, and/or other components, many of which must move in order to lock or unlock a structure.

Accordingly, the methods and systems described herein relate to an improved locking apparatus that reliably locks and unlocks a structure, uses fewer components, and has fewer moving components when locking and unlocking the structure. Such a locking apparatus includes a support assembly, a rotatable shaft (e.g., a shaft connected to a door handle), and a pawl, where the pawl includes a SMA element. A first end of the pawl is attached to the support assembly such that a second end of the pawl is movable between (i) a locked position that prevents the rotatable shaft from rotating via engagement of the second end of the pawl with a lug of the rotatable shaft and (ii) an unlocked position that allows the rotatable shaft to rotate via disengagement of the second end of the pawl from the lug.

Herein, a support assembly refers to an assembly or other physical component(s) that, even if part of the structure itself, does not move when a locking apparatus is being used to lock or unlock the structure. For example, when a door is being unlocked, the pawl moves, but the support assembly to which one or more portions of the pawl is/are attached does not move. As another example, in an aircraft, the support assembly can take the form of a composite door structure that, during flight when all doors are closed, becomes part of the fuselage of the aircraft.

In some implementations of the locking apparatus, the structure can be locked by activating the SMA element, thereby causing the SMA element to take on a first configuration and move the second end of the pawl to the locked position. As noted above, activating the SMA element can involve heating the SMA element. For example, an electrical current could be applied to the SMA element to heat the SMA element. Further, the structure can be unlocked by deactivating the SMA element, thereby causing the SMA element to take on a second configuration and move the second end of the pawl to the unlocked position. As noted above, deactivating the SMA element can involve removing heat from the SMA element. For example, discontinuing application of an electrical current to heat the SMA element can cause thermal energy to be removed from the SMA element, such as by conduction or convection.

The aforementioned implementations bias the locking apparatus to the unlocked position. That is, when power is removed, such as due to an emergency scenario that cuts off electrical current to the SMA element coupled with exposure of the SMA element to excessively cold temperatures of the support assembly and the SMA element's surroundings, the SMA element will quickly move to the unlocked position. This can be particularly useful in some scenarios, such as during an emergency evacuation where individuals need to exit the aircraft.

While examples in this disclosure are primarily described as involving activating the SMA element to lock the structure and deactivating the SMA element to unlock the structure, it should be understood that, in alternative implementations of the locking apparatus, activating the SMA element could move the pawl to the unlocked position and deactivating the SMA element could move the pawl to the locked position, thus biasing the locking apparatus to the locked position. An example scenario in which this may be advantageous is for intrusion protection of a flight deck door or cockpit door of an aircraft where the door is to be secured and locked at all times and should only be opened by the pilot activating the SMA element to unlock the door. Other example scenarios are possible as well, as well as other advantageous.

Different implementations of the locking apparatus may have different types of pawls. For instance, in an example locking apparatus, the pawl is a SMA beam that is attached at one end to the support assembly. Thus, when the SMA beam is activated, the SMA beam engages the lug (e.g., by taking on a configuration where the SMA beam is bent to engage with the lug) and prevents the rotatable shaft from rotating, thereby locking the structure. Whereas, when the SMA beam is deactivated, the SMA beam disengages from the lug (e.g., by taking on a different configuration where the SMA beam bends away from the lug) and allows the rotatable shaft to rotate, thereby unlocking the structure.

In another example locking apparatus, the pawl comprises a torsional SMA tube and a lever. One end of the torsional SMA tube is attached to the support assembly and an opposite end of the torsional SMA tube is attached to the lever. The torsional SMA tube provides rotational motion when transitioning between configurations (e.g., a twisted state and an untwisted state). Thus, when the torsional SMA tube is activated, the torsional SMA tube pivots the lever to engage the lug, thereby locking the structure. Whereas, when the torsional SMA tube is deactivated, the torsional SMA tube pivots the lever to disengage from the lug, thereby unlocking the structure.

Additional improvements provided by implementations of the locking apparatus include a higher locking and unlocking force generated by the SMA element than a locking/unlocking force that might be provided by existing locking apparatuses that include springs, actuators, and solenoids. Further, existing locking apparatuses might not have constant locking/unlocking forces as the pawl deflects to move from a locked position to an unlocked position and vice versa, whereas the SMA element provides a constant (and higher) locking/unlocking force. These higher forces may also help provide more resistance to overcoming a scenario in which the locking apparatus becomes jammed, which is particularly useful in emergency evacuation scenarios. Other improvements, in addition to the aforementioned improvements, are possible as well.

Implementations described below are for purposes of example. The implementations described below, as well as other implementations, may provide other improvements as well.

In this disclosure, examples are described primarily with respect to locking apparatuses used to lock and unlock an aircraft door. However, it should be understood that, in other implementations, locking apparatuses can be implemented in other vehicles or environments and/or to lock/unlock other types of structures.

Referring now to the figures, FIG. 1 is a perspective view of a rotatable shaft 100 and a handle 102, according to an example implementation. The handle 102 is attached to the rotatable shaft 100 and can be used to rotate the rotatable shaft 100 and open the door when the pawl is in the unlocked position. Also shown in FIG. 1 is a lug 103 projecting from the body of the rotatable shaft 100.

Within example implementations, the handle 102 can be attached to the rotatable shaft 100 in various ways. For instance, as shown in FIG. 1, the handle 102 and the rotatable shaft 100 can be integrally formed as a single piece. Alternatively, the handle 102 and the rotatable shaft 100 could be separate pieces that are attached directly. Alternatively, the handle 102 and the rotatable shaft 100 could be separate pieces that are attached via mechanical linkage (e.g., cams, pushrods, bellcranks, etc.) configured to drive the rotatable shaft 100, and in which case the handle 102 and the rotatable shaft 100 might have separate axes of rotation.

Further, in alternative implementations, different mechanisms for rotating the rotatable shaft 100, other than a handle, are possible and could be attached to the rotatable shaft 100.

FIGS. 2, 3, 4, 5, and 6 relate to example locking apparatuses. It should be understood that any one or more of the locking apparatuses described herein could be used, either individually or in combination, to lock and unlock a structure.

Figure 2:
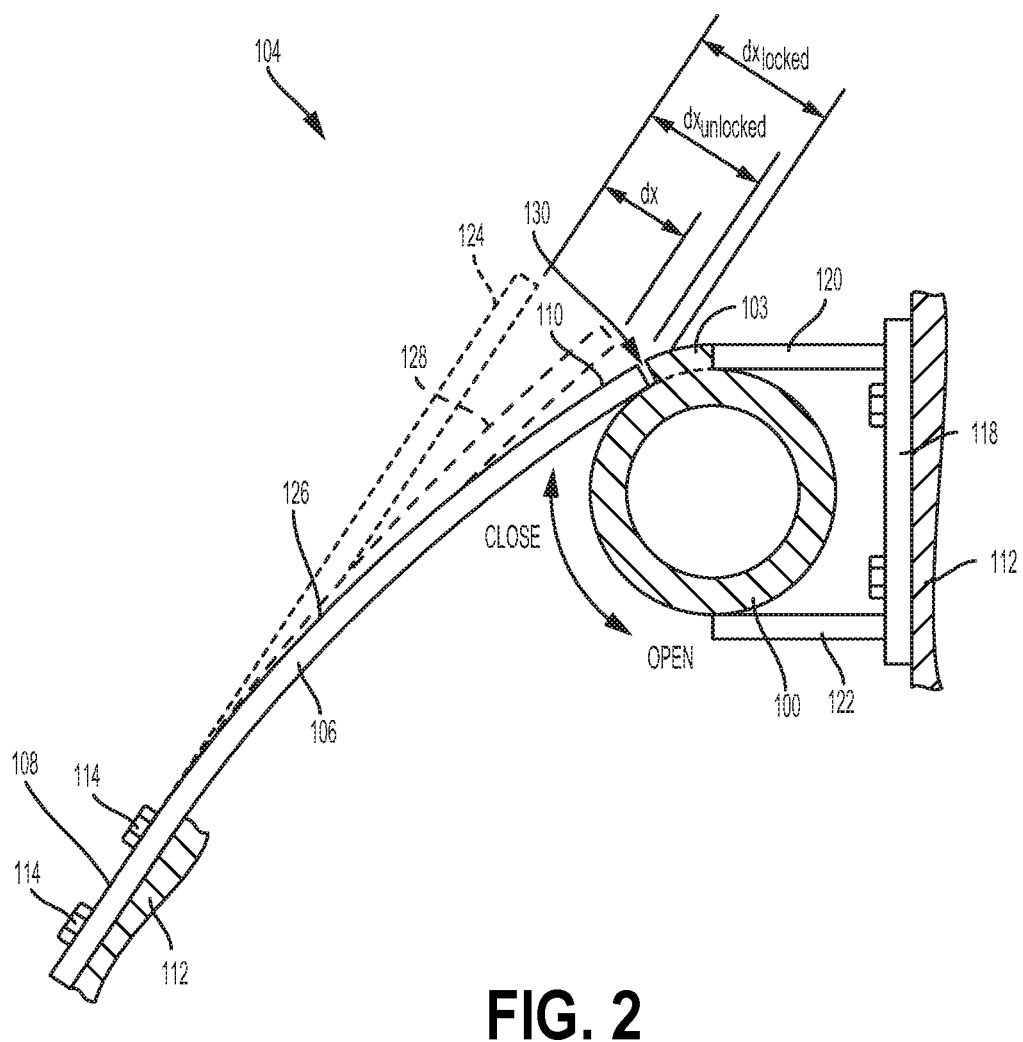
FIG. 2 is a cross-section view of a locking apparatus, according to an example implementation.

FIG. 2 is a cross-section view of an example first locking apparatus 104 in which the pawl is a SMA beam 106. For example, the SMA beam 106 could be a beam structure comprised entirely of a SMA. Alternatively, the SMA beam 106 could be a SMA-plated substrate.

As shown, the SMA beam 106 has a first end 108 and a second end 110. The first end 108 of the SMA beam 106 is attached to a support assembly 112 via at least one fastener 114. Two fasteners are shown in FIG. 2, though more or less are possible in other implementations. Because the SMA beam 106 is attached directly to the support assembly 112, and because the support assembly 112 is typically colder than the SMA beam 106 when the SMA beam 106 is heated, thermal energy can be quickly conducted away from the SMA beam 106 to the support assembly 112, thereby causing the second end 110 of the SMA beam 106 to quickly move to an unlocked position when the SMA beam 106 is no longer being heated. This can be advantageous in various scenarios, such as an emergency in which electrical current to the SMA beam 106 is discontinued and it is desirable to quickly unlock, and exit through, the door.

The first locking apparatus 104 also includes the rotatable shaft 100 from FIG. 1. As also shown in FIG. 1, the rotatable shaft 100 includes the lug 103 projecting from the body of the rotatable shaft 100. Further, the first locking apparatus 104 includes a shaft bearing block 118 attached to the support assembly 112. The shaft bearing block 118 provides support for the rotatable shaft 100. A typical shaft bearing block can include bearings or other accessories that help provide support for the rotatable shaft 100, although such bearings/accessories are not shown in the cross-section view of FIG. 2. The shaft bearing block 118 includes a first limit stop 120 and a second limit stop 122. The first limit stop 120 and the second limit stop 122 define a limited range of rotational movement for the rotatable shaft 100 and the lug 103. That is, the lug 103 cannot rotate past either limit stop. Although other shaft bearing blocks are not shown in FIG. 2, a locking apparatus such as the first locking apparatus 104 (and the second locking apparatus 132) can, in some implementations, include at least one other shaft bearing block, or another form of bearing support, for supporting the rotatable shaft 100. For example, the shaft bearing block 118 shown in FIG. 2 (and FIG. 5) may be one of two shaft bearing blocks being used to support the rotatable shaft 100.

Attached to the support assembly 112 in the manner shown in FIG. 2, activating and deactivating the SMA beam 106 can control the SMA beam 106 to move (e.g., bend) towards or away from the rotatable shaft 100, thus moving the second end 110 of the SMA beam 106 towards or away from the rotatable shaft 100. In particular, the second end 110 of the SMA beam 106 is movable between a locked position and an unlocked position. To illustrate an example range over which the second end 110 of the SMA beam 106 can move, FIG. 2 denotes a deflection distance, dx, of the second end 110 of the SMA beam 106. As shown, the second end 110 of the SMA beam 106 is movable between position 124 (dx=0) and position 126 (dx=dx$_{locked}$), with position 128 also shown as a representative example of a position while the second end 110 is in-transit from position 124 to position 126.

Position 126 is a representative example of a locked position—that is, a position of the SMA beam 106 where an attempt to rotate the rotatable shaft 100 would cause the second end 110 of the SMA beam 106 to engage with the lug 103, thereby preventing the lug 103 from rotating past the second end 110 of the SMA beam 106.

Furthermore, when dx is less than or equal to dx$_{unlocked}$, the second end 110 of the SMA beam 106 is considered to be in an unlocked position—that is, a position of the SMA beam 106 where the second end 110 would not engage with the lug 103 during an attempt to rotate the rotatable shaft 100, and would thus allow the lug 103 to rotate past the second end 110. Both position 124 and position 128 are examples of unlocked positions.

When the SMA beam 106 is activated, this can cause the SMA beam 106 to bend laterally towards the rotatable shaft 100 and move the second end 110 of the SMA beam 106 to a locked position (e.g., position 126). Further, when the second end 110 of the SMA beam 106 is in a locked position and the SMA beam 106 is then deactivated, the SMA beam 106 can begin to move away from the rotatable shaft 100 and move the second end 110 of the SMA beam 106 to an unlocked position (e.g., position 124 or position 128).

Figure 3:
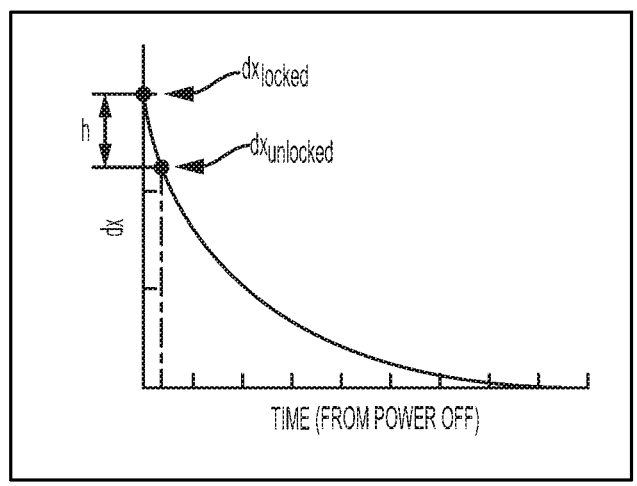
FIG. 3 is a graph depicting deflection of a pawl of the locking apparatus of FIG. 2 over time, according to an example implementation.

FIG. 3 is a graph depicting deflection of the pawl (i.e., the SMA beam 106) of the first locking apparatus 104 over time, according to an example implementation. In particular, the graph depicts the value of dx over time, starting from a deactivation event—that is, the moment when the SMA beam 106 transitions from being heated to no longer being heated. Because $dx_{locked}$ represents a locked position and $dx_{unlocked}$ represents an unlocked position, the difference between $dx_{locked}$ and $dx_{unlocked}$ represents a minimum distance that the second end 110 of the SMA beam 106 must travel after the deactivation event in order to transition from a locked position to an unlocked position and clear the lug 103. Thus, the difference between $dx_{locked}$ and $dx_{unlocked}$ is substantially equal to a height, h, of the lug 103. Furthermore, as shown, the time taken to transition from $dx_{locked}$ to $dx_{unlocked}$ is a relatively small fraction of the total time taken for the SMA beam 106 to cool. Thus, from the moment a deactivation event occurs, the door can quickly be unlocked, which may be particularly useful in an emergency scenario.

Figure 4:
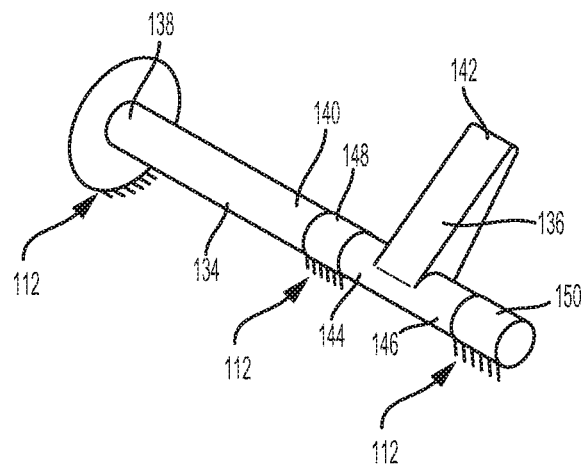
FIG. 4 is a perspective view of another pawl, according to an example implementation.
Figure 5:
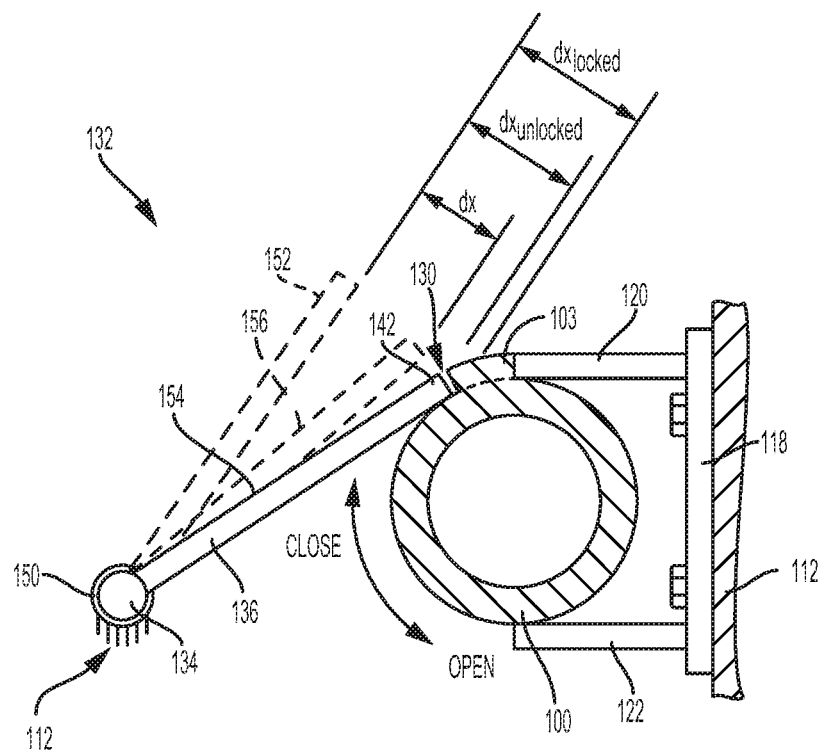
FIG. 5 is a cross-section view of another locking apparatus, including the pawl of FIG. 4, according to an example implementation.

In some implementations, the first locking apparatus 104, as well as the second locking apparatus 132 described with respect to FIGS. 4 and 5, can be designed to have a clearance gap (e.g., 1 to 3 millimeters) between the second end of the pawl and the lug for when the second end of the pawl is in the locked position and the lug is engaging with, or proximate to, the first limit stop. As shown in FIG. 2, for example, there is a clearance gap 130 between the second end 110 of the SMA beam 106 and the lug 103. The purpose of such a clearance gap is to account for the possible deformation of the support assembly, and to allow for movement of the pawl and/or the lug, should such an event occur. In particular, the clearance gap enables the pawl to clear the lug (i.e., transition, from the locked position, a distance greater than or equal to a height of the lug) in the event of a deformation, thus allowing the door to be unlocked. By contrast, if no such clearance gap existed and a deformation in the support assembly occurred, the lug could become jammed between the pawl and the first limit stop to an undesirable degree, thereby preventing the door from unlocking. The clearance gap thus helps avoid this or other undesirable scenarios that could result from deformation.

As noted above, a locking apparatus could include a pawl that is comprised of a torsional SMA tube and a lever. FIGS. 4 and 5 relate to an example second locking apparatus 132 that includes such a pawl. In particular, FIG. 4 is a perspective view of the pawl, and FIG. 5 is a cross-section view of the second locking apparatus 132 including the pawl.

As shown in FIG. 4, a torsional SMA tube 134 is attached to a lever 136 to form the pawl. In particular, a first end 138 of the torsional SMA tube 134 is attached to the support assembly 112 and a second end 140 of torsional SMA tube 134 is attached to the lever 136. Arranged in this way, a distal end 142 of the lever 136 functions as the end of the pawl that engages with, or disengages from, the lug 103 (shown in FIG. 5, not FIG. 4).

The first end 138 of the torsional SMA tube 134 can be attached directly to the support assembly 112, such as by being physically bonded to the support assembly 112. Because the torsional SMA tube 134 is attached directly to the support assembly 112, and because the support assembly 112 is typically colder than the torsional SMA tube 134 when the torsional SMA tube 134 is in a heated state, thermal energy can be quickly conducted away from the torsional SMA tube 134 to the support assembly 112, thereby quickly unlocking the door and achieving the same effect as the SMA beam 106 of the first locking apparatus 104 when the torsional SMA tube 134 is deactivated.

As further shown in FIG. 4, the lever 136 has a first side 144 and a second side 146 that is opposite the first side 144. The second end 140 of the torsional SMA tube 134 is attached to a first side 144 of the lever 136 by way of a first bearing support 148 attached between the lever 136 and the second end 140 of the torsional SMA tube 134. In addition, the second side 146 of the lever 136 is attached to a second bearing support 150. Both the first bearing support 148 and the second bearing support 150 are attached to the support assembly 112 and can advantageously prevent or minimize undesirable moments from being imparted into the torsional SMA tube 134 when the lever 136 experiences load. For example, when the door is locked and the rotatable shaft 100 rotates, such as due to a force on the handle 102, the lug 103 comes into contact with the distal end 142 of the lever 136 and the lever 136 thus experiences a load. Having the first bearing support 148 between the lever 136 and the torsional SMA tube 134 thus prevents or minimizes a cantilever moment, created by the load on the lever 136, from being transferred to the torsional SMA tube 134. Further, having the second bearing support 150 on the other side of the lever 136 can help equally distribute the load from the lever 136 so that not all of the load is distributed to the first bearing support 148. While FIG. 4 depicts both bearing supports, it is possible in alternative implementations to include only the first bearing support 148.

As noted above, FIG. 5 is a cross-section view of the second locking apparatus 132 that includes the pawl comprising the torsional SMA tube 134 and the lever 136. FIG. 5 includes the rotatable shaft 100, the lug 103, and the shaft bearing block 118 shown in FIG. 2.

Because the torsional SMA tube 134 provides rotational motion as noted above, activating and deactivating the torsional SMA tube 134 can control the torsional SMA tube 134 to pivot the lever 136, thus rotating the distal end 142 of the lever 136 towards or away from the rotatable shaft 100. To illustrate an example range over which the distal end 142 of the lever 136 can move, FIG. 5 denotes a deflection distance, dx, of the distal end 142 of the lever 136. As shown, the distal end 142 of the lever 136 is movable between position 152 (dx=0) and position 154 (dx=$dx_{locked}$), with position 156 also shown as a representative example of a position while the distal end 142 is in-transit from position 152 to position 154.

Position 154 is a representative example of a locked position—that is, a position of the distal end 142 of the lever 136 where an attempt to rotate the rotatable shaft 100 would cause the distal end 142 of the lever 136 to engage with the lug 103, thereby preventing the lug 103 from rotating past the distal end 142 of the lever 136.

Furthermore, when dx is less than or equal to $dx_{unlocked}$, the distal end 142 of the lever 136 is considered to be in an unlocked position—that is, a position of the distal end 142 of the lever 136 where the distal end 142 would not engage with the lug 103 during an attempt to rotate the rotatable shaft 100, and would thus allow the lug 103 to rotate past the distal end 142. Both position 152 and position 156 are examples of unlocked positions.

When the torsional SMA tube 134 is activated, the torsional SMA tube 134 can pivot the lever 136 about a longitudinal axis of the torsional SMA tube 134 towards the rotatable shaft 100 and rotate the distal end 142 of the lever 136 to a locked position (e.g., position 154). Further, when the distal end 142 of the lever 136 is in a locked position and the torsional SMA tube 134 is then deactivated, the torsional SMA tube 134 can pivot the lever 136 about the longitudinal axis of the torsional SMA tube 134 away from the rotatable shaft 100 and rotate the distal end 142 of the lever 136 to an unlocked position (e.g., position 152 or position 156).

The deflection of the lever 136 of the second locking apparatus 132 over time can be similar to that of the SMA beam 106 of the first locking apparatus 104. Thus, the graph shown in FIG. 3 similarly depicts the deflection of the lever 136 of the second locking apparatus 132. As such, the difference between $dx_{locked}$ and $dx_{unlocked}$ (i.e., a minimum distance that the distal end 142 of the lever 136) must travel after a deactivation event in order to transition from a locked position to an unlocked position and clear the lug 103 is substantially equal to a height, h, of the lug 103. Similar to the SMA beam 106, the time taken to transition from $dx_{locked}$ to $dx_{unlocked}$ is a relatively small fraction of the total time taken for the torsional SMA tube 134 to cool. Thus, from the moment a deactivation event occurs, the door can quickly be unlocked, which may be particularly useful in an emergency scenario.

Figure 6:
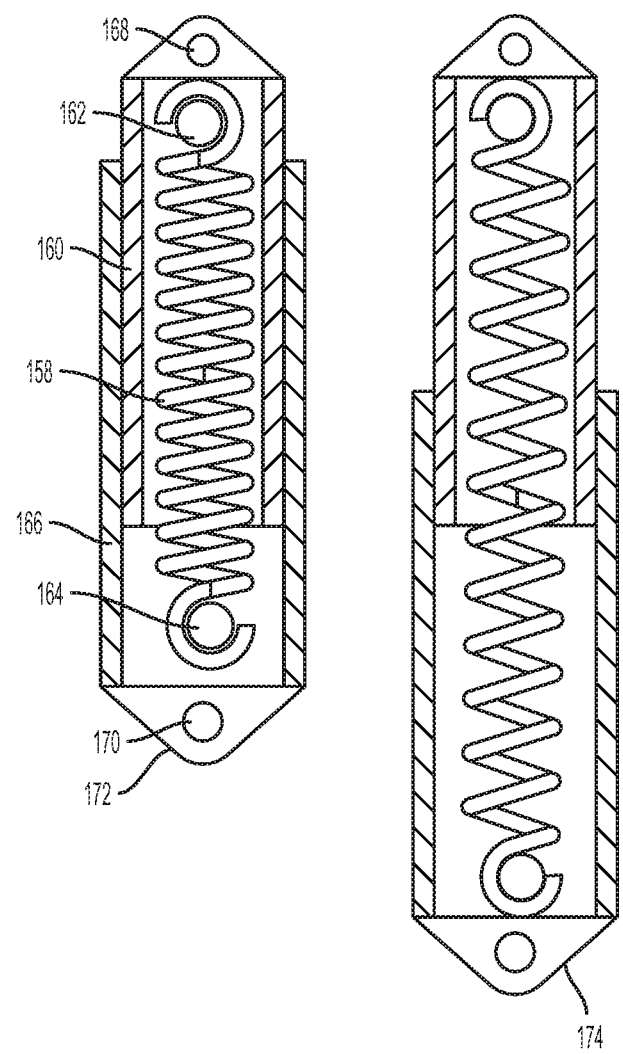
FIG. 6 is a cross-section of a portion of another locking apparatus, according to an example implementation.

FIG. 6 is a cross-section of a portion of another type of pawl that could be used as part of a locking apparatus, such as a replacement for a solenoid or electromechanical actuation means in existing locking apparatuses. As shown, a linear SMA spring 158 is attached within an inner guide tube 160 between a first SMA attach bolt 162 and a second SMA attach bolt 164. The first SMA attach bolt 162 is attached to the inner guide tube 160 and the second SMA attach bolt 164 is attached to an outer guide tube 166. The inner guide tube 160 is movable and supported within the outer guide tube 166 such that the outer guide tube 166 guides movement of the inner guide tube 160 and the inner guide tube 160 guides movement of the linear SMA spring 158. Further, although not explicitly shown, the inner guide tube 160 can be attached to a support assembly (not shown, but could be support assembly 112) via a first guide tube attach bolt 168. In addition, although not explicitly shown, the outer guide tube 166 can be attached to a lever (not shown) via a second guide tube attach bolt 170. The lever can be configured to move between a locked position where the lever prevents rotation of a lug of a rotatable shaft via engagement of the lever with the lug and an unlocked position where the lever allows rotation of the lug of the rotatable shaft via disengagement of the lever from the lug.

In alternative implementations, the inner guide tube 160 could be attached to the lever and the outer guide tube 166 could be attached to the support assembly. Further, in alternative implementations, another component, instead of a lever, could be used for allowing/preventing rotation of a lug of a rotatable shaft.

With the arrangement shown in FIG. 6, the linear SMA spring 158 can be activated and deactivated to move between position 172 and position 174. For example, position 172 can be the position when the linear SMA spring 158 is deactivated, which can correspond to the lever being in an unlocked position. Further, position 174 can be the position when the linear SMA spring 158 is activated, which can correspond to the lever being in a locked position. With these as the locked/unlocked positions, a locking apparatus implementing the components shown in FIG. 6 would be biased to the unlocked position. Thus, when power is removed, such as due to an emergency scenario that cuts off electrical current to the linear SMA spring coupled with exposure of the linear SMA spring to cold surrounding temperatures, the linear SMA spring will quickly move to the unlocked position. This can be particularly useful in some scenarios, such as during an emergency where individuals need to exit the aircraft.

Figure 7:
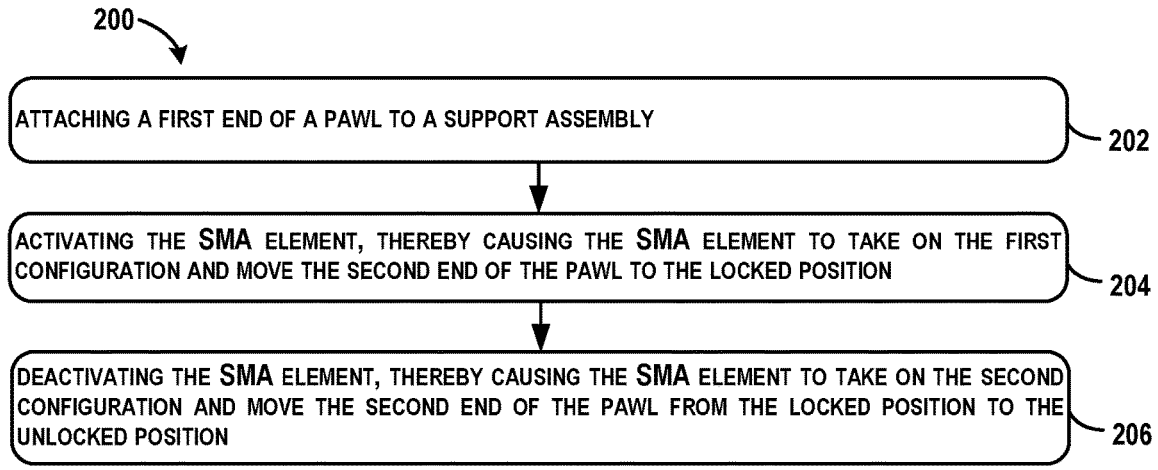
FIG. 7 shows a flowchart of an example method for locking and unlocking a structure, according to an example implementation.

FIG. 7 shows a flowchart of an example of a method 200 for locking and unlocking a structure, according to an example implementation. Method 200 shown in FIG. 7 presents an example of a method that could be used with the first locking apparatus 104 or the second locking apparatus 132, for example. Further, devices or systems may be used or configured to perform logical functions presented in FIG. 7. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-206. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 7, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes attaching a first end of a pawl to a support assembly. The pawl includes a SMA element that is configured to transition between a first configuration and a second configuration. The pawl is attached to the support assembly such that a second end of the pawl is movable between a locked position that prevents a rotatable shaft from rotating via engagement of the second end of the pawl with a lug of the rotatable shaft and an unlocked position that allows the rotatable shaft to rotate via disengagement of the second end of the pawl from the lug.

At block 204, the method 200 includes activating the SMA element, thereby causing the SMA element to take on the first configuration and move the second end of the pawl to the locked position.

At block 206, the method 200 includes deactivating the SMA element, thereby causing the SMA element to take on the second configuration and move the second end of the pawl from the locked position to the unlocked position.

Figure 8:
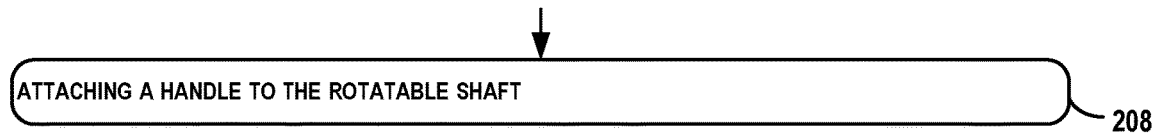
FIG. 8 shows a flowchart of an example method for use with the method of FIG. 7, according to an example implementation.

FIG. 8 shows a flowchart of another example method for use with the method 200, according to an example implementation. At block 208, functions include attaching a handle to the rotatable shaft.

Figure 9:
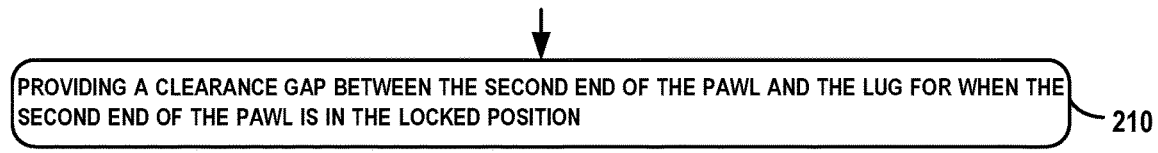
FIG. 9 shows a flowchart of another example method for use with the method of FIG. 7, according to an example implementation.

FIG. 9 shows a flowchart of another example method for use with the method 200, according to an example implementation. At block 210, functions include providing a clearance gap between the second end of the pawl and the lug for when the second end of the pawl is in the locked position.

Figure 10:
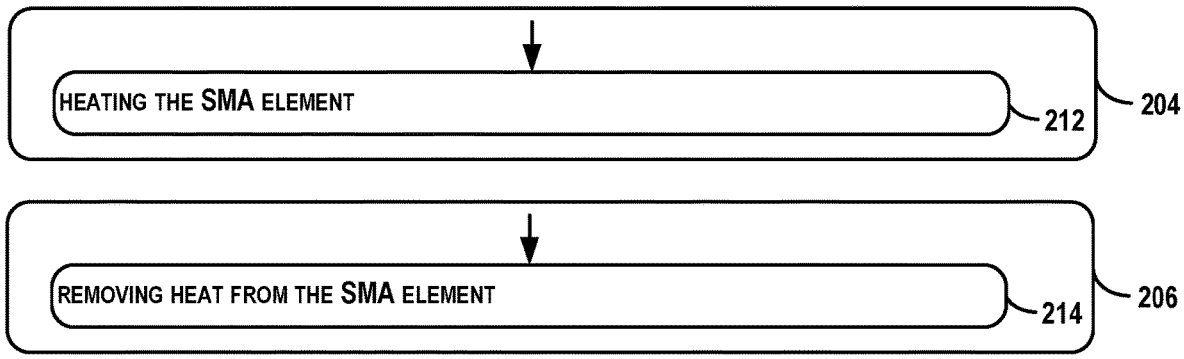
FIG. 10 shows a flowchart of an example method for performing the deactivating function of the method of FIG. 7, according to an example implementation.

FIG. 10 shows a flowchart of an example method for performing the activating and deactivating as shown in block 204 and block 206, respectively, according to an example implementation. At block 212, functions include heating the SMA element, and at block 214, functions include removing heat from the SMA element.

Figure 11:
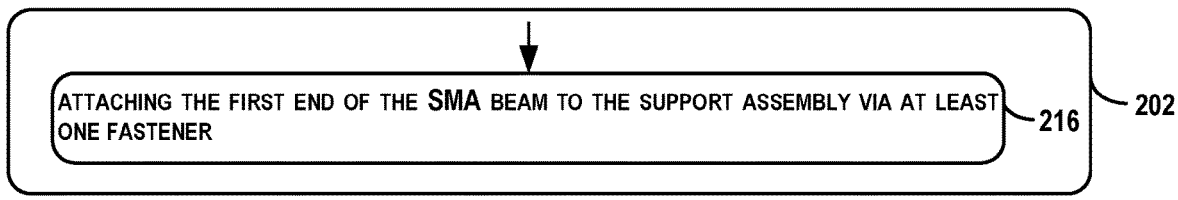
FIG. 11 shows a flowchart of an example method for performing the attaching function of the method of FIG. 7, according to an example implementation.
Figure 12:
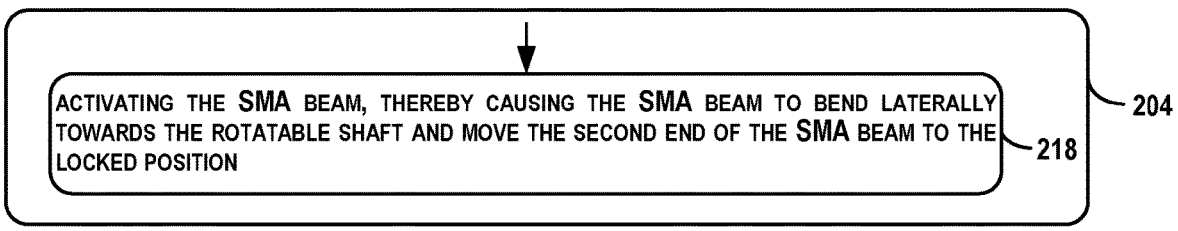
FIG. 12 shows a flowchart of an example method for performing the activating function of the method of FIG. 7, according to an example implementation.

In some implementations, the pawl is a SMA beam, the first end of the pawl is a first end of the SMA beam, and the second end of the pawl is a second end of the SMA beam. The flowcharts shown in FIGS. 11 and 12 relate to such implementations. FIG. 11 shows a flowchart of an example method for performing the attaching as shown in block 202, according to an example implementation. At block 216, functions include attaching the first end of the SMA beam to the support assembly via at least one fastener. Further, FIG. 12 shows a flowchart of an example method for performing the activating as shown in block 204, according to an example implementation. At block 218, functions include activating the SMA beam, thereby causing the SMA beam to bend laterally towards the rotatable shaft and move the second end of the SMA beam to the locked position.

Figure 13:
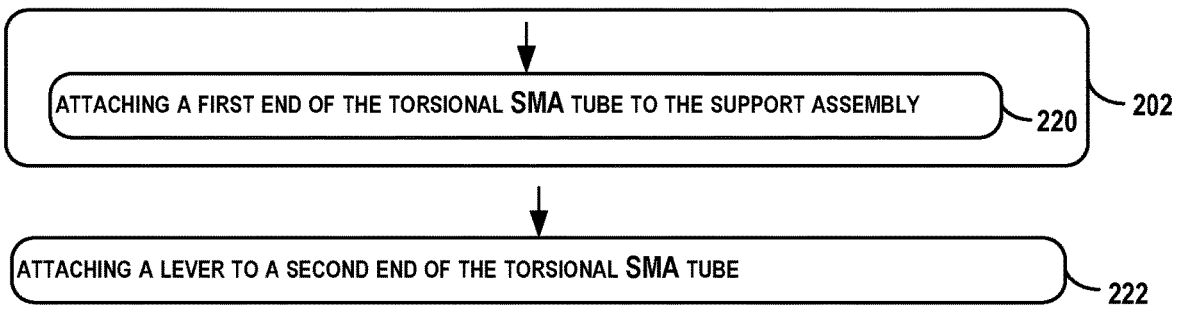
FIG. 13 shows a flowchart of an example method for performing the attaching function of the method of FIG. 7, as well as a flowchart of another example method for use with the method of FIG. 7, according to an example implementation.

In some implementations, the SMA element is a torsional SMA. The flowcharts shown in FIGS. 13, 14, and 15 relate to such implementations. FIG. 13 shows a flowchart of an example method for performing the attaching as shown in block 202, according to an example implementation. At block 220, functions include attaching a first end of the torsional SMA tube to the support assembly. Further, FIG. 13 shows a flowchart of another example method for use with the method 200, according to an example implementation. At block 222, functions include attaching a lever to a second end of the torsional SMA tube. The second end of the pawl is a distal end of the lever.

Figure 14:
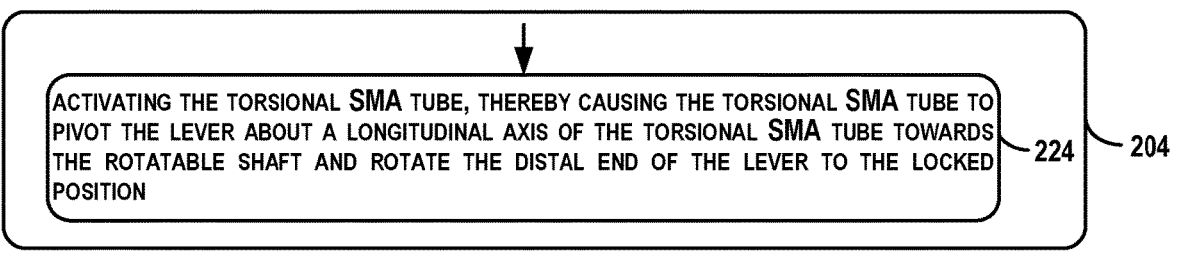
FIG. 14 shows a flowchart of an example method for performing the activating and deactivating functions of the method of FIG. 7, according to an example implementation.
Figure 14:
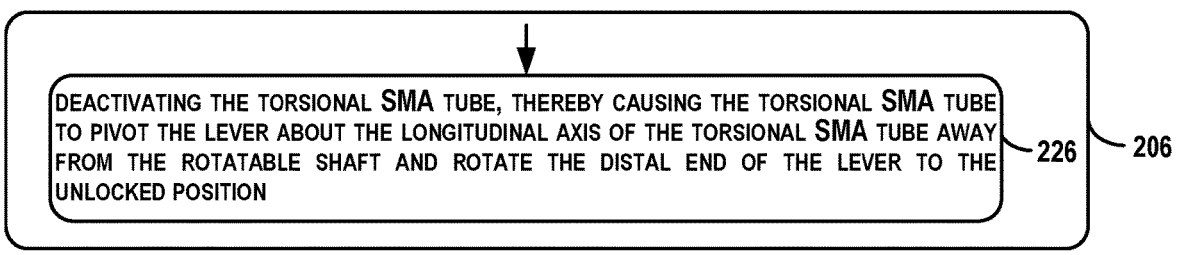

FIG. 14 shows a flowchart of an example method for performing the activating and deactivating as shown in block 204 and block 206, respectively, according to an example implementation. At block 224, functions include activating the torsional SMA tube, thereby causing the torsional SMA tube to pivot the lever about a longitudinal axis of the torsional SMA tube towards the rotatable shaft and rotate the distal end of the lever to the locked position. And at block 226, functions include deactivating the torsional SMA tube, thereby causing the torsional SMA tube to pivot the lever about the longitudinal axis of the torsional SMA tube away from the rotatable shaft and rotate the distal end of the lever to the unlocked position.

Figure 15:
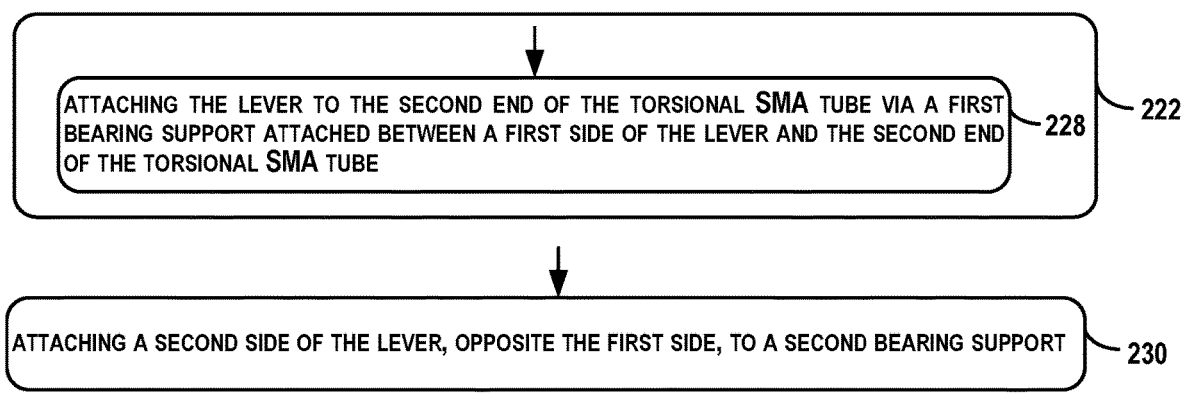
FIG. 15 shows a flowchart of an example method for performing the attaching function of the method of FIG. 13, as well as a flowchart of another example method for use with the method of FIG. 7, according to an example implementation.

FIG. 15 shows a flowchart of an example method for performing the attaching as shown in block 222, according to an example implementation. At block 228, functions include attaching the lever to the second end of the torsional SMA tube via a first bearing support attached between a first side of the lever and the second end of the torsional SMA tube. Further, FIG. 15 shows a flowchart of another example method for use with the method 200, according to an example implementation. At block 230, functions include attaching a second side of the lever, opposite the first side, to a second bearing support. In such implementations, both the first bearing support and the second bearing support can be attached to the support assembly.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for locking and unlocking a structure, the method comprising:
   attaching a first end of a pawl to a support assembly, wherein the pawl is a shape memory alloy (SMA) element-beam configured to transition between a first configuration and a second configuration, and wherein the pawl is attached to the support assembly such that a second end of the pawl is movable between a locked position that prevents a rotatable shaft from rotating via engagement of the second end of the pawl with a lug of the rotatable shaft and an unlocked position that allows the rotatable shaft to rotate via disengagement of the second end of the pawl from the lug, wherein the first end of the pawl is a first end of the SMA beam, wherein the second end of the pawl is a second end of the SMA beam, and wherein attaching the first end of the pawl to the support assembly comprises attaching the first end of the SMA beam to the support assembly via at least one fastener;
   activating the SMA beam, thereby causing the SMA beam to take on the first configuration and move the second end of the pawl to the locked position; and
   deactivating the SMA beam, thereby causing the SMA beam to take on the second configuration and move the second end of the pawl from the locked position to the unlocked position.

2. The method of claim 1, further comprising:
   attaching a handle to the rotatable shaft.

3. The method of claim 1, further comprising:
providing a clearance gap between the second end of the pawl and the lug for when the second end of the pawl is in the locked position.

4. The method of claim 1, wherein activating the SMA beam comprises heating the SMA beam, and
wherein deactivating the SMA beam comprises removing heat from the SMA beam.

5. The method of claim 1, wherein a minimum distance between the locked position to the unlocked position is substantially equal to a height of the lug, and
wherein deactivating the SMA beam causes the second end of the pawl to move the minimum distance.

6. The method of claim 1, wherein activating the SMA beam thereby causing the SMA beam to take on the first configuration and move the second end of the pawl to the locked position, comprises activating the SMA beam, thereby causing the SMA beam to bend laterally towards the rotatable shaft and move the second end of the SMA beam to the locked position.

7. A locking apparatus comprising:
a support assembly;
a rotatable shaft comprising a lug; and
a pawl configured to transition between a first configuration and a second configuration, wherein a first end of the pawl is attached to the support assembly such that a second end of the pawl is movable between a locked position that prevents the rotatable shaft from rotating via engagement of the second end of the pawl with a lug of the rotatable shaft and an unlocked position that allows the rotatable shaft to rotate via disengagement of the second end of the pawl from the lug,
wherein the pawl is a shape memory alloy (SMA) beam,
wherein the first end of the pawl is a first end of the SMA beam,
wherein the second end of the pawl is a second end of the SMA beam,
wherein attaching the first end of the pawl to the support assembly comprises attaching the first end of the SMA beam to the support assembly via at least one fastener,
wherein, when the SMA beam is activated, the SMA beam takes on the first configuration and moves the second end of the pawl to the locked position, and
wherein, when the SMA beam is deactivated, the SMA beam takes on the second configuration and moves the second end of the pawl from the locked position to the unlocked position.

8. The locking apparatus of claim 7, further comprising:
a handle attached to the rotatable shaft.

9. The locking apparatus of claim 7, wherein the SMA beam is activated by heating the SMA beam, and
wherein the SMA beam is deactivated by removing heat from the SMA beam.

10. The locking apparatus of claim 7, wherein a minimum distance between the locked position to the unlocked position is substantially equal to a height of the lug, and
wherein deactivating the SMA beam causes the second end of the pawl to move the minimum distance.

11. The locking apparatus of claim 7, further comprising a clearance gap between the second end of the pawl and the lug for when the second end of the pawl is in the locked position.

12. The locking apparatus of claim 7, wherein, when the SMA beam is activated, the SMA beam bends laterally towards the rotatable shaft and moves the second end of the SMA beam to the locked position.

13. The locking apparatus of claim 7, wherein the support assembly is a composite door structure that becomes part of a fuselage of an aircraft when the composite door structure is closed.

14. A locking apparatus comprising:
a support assembly;
a rotatable shaft comprising a lug; and
a pawl comprised entirely of a shape memory alloy (SMA) material and configured to transition between a first configuration and a second configuration, wherein a first end of the pawl is attached to the support assembly such that a second end of the pawl is movable between a locked position that prevents the rotatable shaft from rotating via engagement of the second end of the pawl with a lug of the rotatable shaft and an unlocked position that allows the rotatable shaft to rotate via disengagement of the second end of the pawl from the lug,
wherein, when the SMA material is activated, the pawl takes on the first configuration and the second end of the pawl moves to the locked position, and
wherein, when the SMA material is deactivated, the pawl takes on the second configuration and the second end of the pawl moves from the locked position to the unlocked position.

15. The locking apparatus of claim 14, further comprising:
a handle attached to the rotatable shaft.

16. The locking apparatus of claim 14, wherein the SMA material is activated by heating the pawl, and
wherein the SMA material is deactivated by removing heat from the pawl.

17. The locking apparatus of claim 14, wherein the pawl is a SMA beam,
wherein the first end of the pawl is a first end of the SMA beam,
wherein the second end of the pawl is a second end of the SMA beam, and
wherein the first end of the SMA beam is attached to the support assembly via at least one fastener.

18. The locking apparatus of claim 17, wherein, when the SMA beam is activated, the SMA beam bends laterally towards the rotatable shaft and moves the second end of the SMA beam to the locked position.

19. The locking apparatus of claim 14, wherein a minimum distance between the locked position to the unlocked position is substantially equal to a height of the lug, and
wherein deactivating the SMA material caused the second end of the pawl to move the minimum distance.

20. The locking apparatus of claim 14, wherein the support assembly is a composite door structure that becomes part of a fuselage of an aircraft when the composite door structure is closed.

* * * * *